United States Patent
Zhang

(10) Patent No.: US 9,928,134 B2
(45) Date of Patent: Mar. 27, 2018

(54) METHOD AND APPARATUS FOR REPAIRING DYNAMIC LINK LIBRARY FILE

(71) Applicant: TENCENT TECHNOLOGY (SHENZHEN) COMPANY LIMITED, Shenzhen (CN)

(72) Inventor: Shiwei Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 15/102,970

(22) PCT Filed: Apr. 10, 2015

(86) PCT No.: PCT/CN2015/076231
§ 371 (c)(1),
(2) Date: Jun. 9, 2016

(87) PCT Pub. No.: WO2015/154700
PCT Pub. Date: Oct. 15, 2015

(65) Prior Publication Data
US 2016/0314036 A1   Oct. 27, 2016

(30) Foreign Application Priority Data

Apr. 11, 2014  (CN) .......................... 2014 1 0145380

(51) Int. Cl.
*G06F 11/00* (2006.01)
*G06F 11/07* (2006.01)
*G06F 9/445* (2018.01)

(52) U.S. Cl.
CPC ............ *G06F 11/0793* (2013.01); *G06F 8/61* (2013.01); *G06F 8/65* (2013.01); *G06F 9/44521* (2013.01); *G06F 11/00* (2013.01); *G06F 11/0721* (2013.01)

(58) Field of Classification Search
CPC ...... G06F 11/36; G06F 11/362; G06F 11/366; G06F 11/0793; G06F 9/44521; G06F 8/61; G06F 8/65; G06F 8/70
See application file for complete search history.

(56) References Cited

U.S. PATENT DOCUMENTS 6,353,928 B1 * 3/2002 Altberg ..................... G06F 8/61
717/175
8,015,450 B1 * 9/2011 Cooley ............... G06F 9/44521
714/38.1

(Continued)

FOREIGN PATENT DOCUMENTS

CN   102402455 A   4/2012
CN   103530118 A   1/2014

OTHER PUBLICATIONS

Determining Which Linking Method to Use, 2015, Microsoft.*

(Continued)

*Primary Examiner* — Michael Maskulinski
(74) *Attorney, Agent, or Firm* — Morgan, Lewis & Bockius LLP

(57) ABSTRACT

A method for repairing a dynamic link library (DLL) file includes: reading an import section in an executable file; determining, according to DLL file information recorded in the import section and a pre-established correspondence between a DLL file and a save path, that a DLL file is lost; and notifying, when an instruction for running the executable file is received, that the DLL file is lost, and calling an installation package of the DLL file to repair the DLL file.

(Continued)

The apparatus includes: a reading module, a determining module and a repairing module.

12 Claims, 4 Drawing Sheets

(56) References Cited

U.S. PATENT DOCUMENTS

| | | | |
|---|---|---|---|
| 2002/0023224 A1* | 2/2002 | Safa | G06F 9/44521 713/190 |
| 2002/0087949 A1* | 7/2002 | Golender | G06F 9/4446 717/124 |
| 2002/0112058 A1 | 8/2002 | Weisman et al. | |
| 2004/0226031 A1* | 11/2004 | Zimmerman | G06F 9/44521 719/331 |
| 2006/0005078 A1* | 1/2006 | Guo | G06F 11/366 714/38.11 |
| 2009/0049214 A1 | 2/2009 | Chen et al. | |

OTHER PUBLICATIONS

Determining Which Linking Method to Use, 2013, Microsoft.*
Written Opinion, International application No. PCT/CN2015/076231, dated Jul. 1, 2015.
International Search Report, International application No. PCT/CN2015/076231, dated Jul. 1, 2015.
Tencent Technology, Written Opinion, PCT/CN2015/076231, dated Jul. 1, 2015, 3 pgs.
Tencent Technology, IPRP, PCT/CN2015/076231, Oct. 12, 2016, 4 pgs.

* cited by examiner

```
┌──────────────────────────────────────────────────┐ ┌─ 101
│   Read an import section in an executable file   │
└──────────────────────────────────────────────────┘
                        │
                        ▼
┌──────────────────────────────────────────────────┐ ┌─ 102
│ Determine, according to DLL file information recorded in the import │
│ section and a pre-established correspondence between a DLL file and │
│            a save path, that a DLL file is lost                     │
└──────────────────────────────────────────────────┘
                        │
                        ▼
┌──────────────────────────────────────────────────┐ ┌─ 103
│  Notify, when an instruction for running the executable file is    │
│ received, that the DLL file is lost, and call an installation package of │
│            the DLL file to repair the DLL file                     │
└──────────────────────────────────────────────────┘
```

FIG. 1

```
Microsoft (R) COFF/PE Dumper Version 8.00.50727.762
Copyright (C) Microsoft Corporation.  All rights reserved.

Dump of file C:\Windows\System32\notepad.exe

File Type: EXECUTABLE IMAGE

Section contains the following imports:

ADVAPI32.dll
              1001000 Import Address Table
              100A234 Import Name Table
             FFFFFFFF time date stamp
             FFFFFFFF Index of first forwarder reference 77C71C82    27E RegSetValueExW
        77C7BCD5    26E RegQueryValueExW
        77C7BED4    230 RegCloseKey
        77C71CC0    23C RegCreateKeyW
        77C7BEC4    261 RegOpenKeyExW
        77C7BEE4    180 IsTextUnicode
        77C79A61     57 CloseServiceHandle
        77C6D225    224 QueryServiceConfigW
        77C6D20D    1FB OpenServiceW
        77C6D1F5    1F9 OpenSCManagerW KERNEL32.dll
              100102C Import Address Table
              100A260 Import Name Table
             FFFFFFFF time date stamp
```

FIG. 2

METHOD AND APPARATUS FOR REPAIRING DYNAMIC LINK LIBRARY FILE

FIELD OF THE TECHNOLOGY

Cross-Reference to Related Application

This application is a national phase application of PCT/CN2015/076231, filed on Apr. 10, 2015, which claims the benefit of and priority to Chinese Patent Application No. 201410145380.8 filed on Apr. 11, 2014 by Tencent Technology (Shenzhen) Co., Ltd. and entitled "METHOD AND DEVICE FOR IMAGE PROCESSING", the disclosures of which are incorporated herein by reference in their entirety.

The present disclosure relates to the field of communications, and in particular, to a method and an apparatus for repairing a dynamic link library (DLL) file.

BACKGROUND OF THE DISCLOSURE

With the development of computer technologies, there are increasingly more types of client software. In order to reduce software size so as to facilitate independent development and better release and iteration, each software company reduces interdependence between developers, and different modules are kept to be independent from each other by using a method of a dynamic data library (DLL) during software development, so that reuse of code and effective use of memory are promoted. However, meanwhile some inevitable problems are brought, for example, a version of the DLL is inconsistent with a version of an executable program, or the DLL is deleted mistakenly or renamed. All these situations cause DLL file loss when a program is started or run, thereby resulting in an abnormal end or even a crash.

At present, common software cannot manage a situation in which a DLL file of the software is lost, but lets a program end abnormally. A good software developer notifies a user of DLL file loss before installation of a program.

However, defects of the foregoing method are as follows: When a user sees a dialog box indicating DLL file loss, the user always does not know what to do; and even the user downloads a DLL file manually, the DLL file cannot be installed because the user does not know a correct save path; therefore, it is difficult to manually repair the DLL file as manual repairing has a high requirement on the user.

SUMMARY

One aspect provides a method for repairing a DLL file, including:
  reading an import section in an executable file;
  determining, according to DLL file information recorded in the import section and a pre-established correspondence between a DLL file and a save path, that a DLL file is lost; and
  notifying, when an instruction for running the executable file is received, that the DLL file is lost, and calling an installation package of the DLL file to repair the DLL file.

Another aspect provides an apparatus for repairing a DLL file, including:
  a reading module, configured to read an import section in an executable file;
  a determining module, configured to determine, according to DLL file information recorded in the import section and a pre-established correspondence between a DLL file and a save path, that a DLL file is lost; and
  a repairing module, configured to notify, when an instruction for running the executable file is received, that the DLL file is lost, and call an installation package of the DLL file to repair the DLL file.

BRIEF DESCRIPTION OF THE DRAWINGS

To describe the technical solutions of the embodiments of the present invention more clearly, the following briefly introduces the accompanying drawings required for describing the embodiments. Apparently, the accompanying drawings in the following description show only some embodiments of the present invention, and a person of ordinary skill in the art may still derive other drawings from these accompanying drawings without creative efforts.

FIG. 1 is a flowchart of a method for repairing a DLL file according to Embodiment 1 of the present invention;

FIG. 2 is a schematic diagram of an import section according to Embodiment 1 of the present invention;

DESCRIPTION OF EMBODIMENTS

Figure 3:
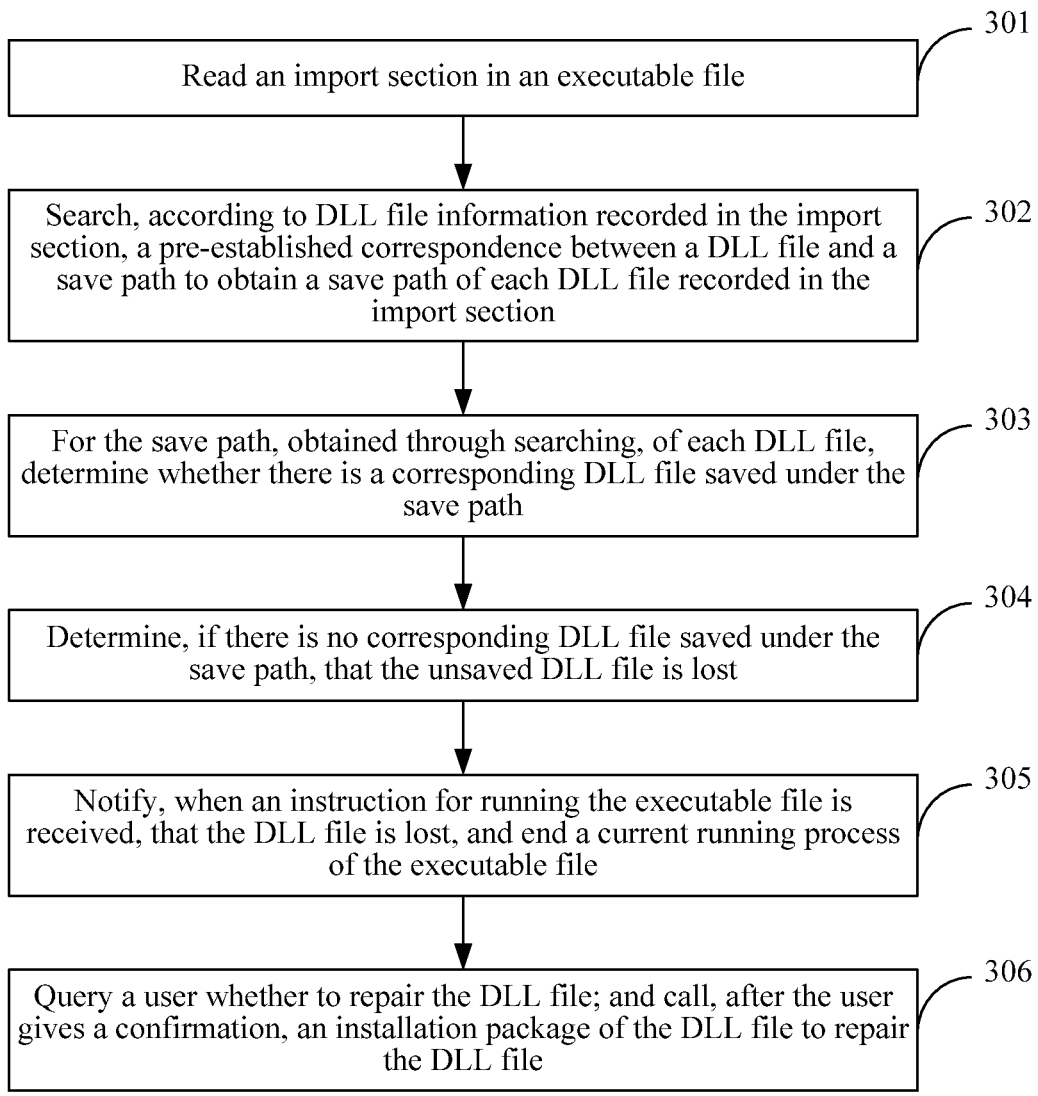
FIG. 3 is a flowchart of a method for repairing a DLL file according to Embodiment 2 of the present invention.

To make the objectives, technical solutions, and advantages of the present disclosure clearer, implementation manners of the present disclosure are further described below in detail with reference to the accompanying drawings.

Embodiment 1

Referring to FIG. 1, this embodiment provides a method for repairing a DLL file, including:

101: Read an import section in an executable file.

Generally, the executable file includes the import section. The import section lists DLL files needed by the executable file, and symbols, including functions, variables and the like, that are referenced by the executable file from the DLL files.

For example, referring to FIG. 2, FIG. 2 is a schematic diagram of some content of an executable file notepad.exe, which includes the import section. The import section lists DLL files needed by the executable file notepad.exe, including ADVAPI32.dll, KERNEL32.dll, and the like, and functions used in the DLL files. For example, an ADVAPI32.dll file uses functions RegSetValueExW, RegQueryValueExW, RegCloseKey, and the like, which are not listed one by one herein.

102: Determine, according to DLL file information recorded in the import section and a pre-established correspondence between a DLL file and a save path, that a DLL file is lost.

In this embodiment, the DLL file information at least includes a name of a DLL file, and may further include a name of an executable file to which the DLL file belongs. The pre-established correspondence may be stored in a local device in the form of a list. The correspondence may include: a name of a DLL file and a corresponding save path, or may include: a name of a DLL file, a corresponding save path, and a name of an executable file. This embodiment does not specifically limit the correspondence. The name of a DLL file may be used as an index for searching for a corresponding save path.

103: Notify, when an instruction for running the executable file is received, that the DLL file is lost, and call an installation package of the DLL file to repair the DLL file.

Because it is determined that the DLL file is lost, a current running process of the executable file ends abnormally, that is, cannot run any longer. Notifying that the DLL file is lost can help a user to know in time a reason for failed running of the executable file, so as to determine a subsequent operation.

In addition, a form of a pop-up dialog box may be used for notifying that the DLL file is lost, for example, a TIPS window, and notification content is displayed in the dialog box. Certainly, another manner may also be used for implementation, which is not specifically limited in this embodiment.

In this embodiment, the installation package of the DLL file may be provided by an operating system of a local device. When it is determined to perform repairing, the installation package may be automatically called to perform installation of the DLL file, to ensure that the executable file can be executed normally during running next time. A process of the installation is performed automatically. The user does not need to know where is a save path of the DLL file. Therefore, a requirement on the user is reduced greatly, and the user may automatically complete repairing of the DLL file according to a notification, thereby facilitating use for a user.

In this embodiment, the determining, according to DLL file information recorded in the import section and a pre-established correspondence between a DLL file and a save path, that a DLL file is lost may include:

searching, according to the DLL file information recorded in the import section, the pre-established correspondence between a DLL file and a save path to obtain a save path of each DLL file recorded in the import section;

determining, for the save path of each DLL file obtained through searching, whether there is a corresponding DLL file saved under the save path; and determining, if there is no corresponding DLL file saved under the save path, that the unsaved DLL file is lost.

In this embodiment, before the calling an installation package of the DLL file to repair the DLL file, the method may further include:

ending a current running process of the executable file.

In this embodiment, the calling an installation package of the DLL file to repair the DLL file may include:

querying a user whether to repair the DLL file; and calling, after the user gives a confirmation, the installation package of the DLL file to repair the DLL file.

In this embodiment, the method may further include:

determining, when the instruction for running the executable file is received again, whether repairing of the DLL file is completed; and responding, if the repairing of the DLL file is completed, to the instruction that is received again and running the executable file; and refusing, if the repairing of the DLL file is not completed, to respond to the instruction that is received again, or responding to the instruction that is received again after the repairing is completed.

In the foregoing method provided in this embodiment, an import section in an executable file is read; it is determined, according to DLL file information recorded in the import section and a pre-established correspondence between a DLL file and a save path, that a DLL file is lost; and it is notified, when an instruction for running the executable file is received, that the DLL file is lost, and an installation package of the DLL file is called to repair the DLL file. Therefore, intelligent awareness of loss of the DLL file is achieved, and repairing is automatically performed after a user is notified, thereby facilitating repairing of the DLL file; the user does not need to manually perform processes such as downloading and installation, thereby reducing a requirement on the user, achieving an easy operation, and facilitating use for the user. Moreover, during running of the executable file, loss of the DLL file may be determined without the need of performing an operation of loading the DLL file to an address space, and pre-determining is completed before the running, thereby improving repairing efficiency.

Embodiment 2

Referring to FIG. 3, this embodiment provides a method for repairing a DLL file, including:

301: Read an import section in an executable file.

302: Search, according to DLL file information recorded in the import section, a pre-established correspondence between a DLL file and a save path to obtain a save path of each DLL file recorded in the import section.

303: Determine, for the save path of each DLL file obtained through searching, whether there is a corresponding DLL file saved under the save path.

In this embodiment, if the read import section includes multiple DLL files, save paths of the multiple DLL files are obtained through searching. Therefore, the multiple save paths are determined one by one, so as to learn whether a DLL file is lost and which specific DLL file is lost.

304: Determine, if there is no corresponding DLL file saved under the save path, that the unsaved DLL file is lost.

For any save path, if there is a corresponding DLL file saved under the save path, it may be determined that the DLL file is not lost, and if there is no corresponding DLL file saved under the save path, it may be determined that the DLL file is lost.

When there are multiple DLL files in the import section, save paths of the multiple DLL files are determined one by one. If corresponding DLL files are saved under all save paths, it may be determined that no DLL file is lost, and the executable file may be run normally. This embodiment mainly involves a scenario in which a DLL file is lost, and therefore, a scenario in which no DLL file is lost is not described further. Certainly, for the scenario in which a DLL file is lost, one or multiple DLL files may be lost. In this embodiment, information of all lost DLL files may be acquired, so as to perform repairing one by one.

305: Notify, when an instruction for running the executable file is received, that the DLL file is lost, and end a current running process of the executable file.

Because a DLL file is lost, the executable file cannot be normally run currently, and is abnormally ended. Only after repairing of the lost DLL file succeeds, the executable file can be run normally.

306: Query a user whether to repair the DLL file; and call, after the user gives a confirmation, an installation package of the DLL file to repair the DLL file.

In this embodiment, further, the method may further include:

determining, when the instruction for running the executable file is received again, whether repairing of the DLL file is completed; and responding, if the repairing of the DLL file is completed, to the instruction that is received again and running the executable file; and refusing, if the repairing of the DLL file is not completed, to respond to the instruction that is received again, or responding to the instruction that is received again after the repairing is completed.

After the repairing of the lost DLL file is completed, if the executable file is run again, the DLL file can be correctly loaded to an address space that is allocated for the executable file, so that it is ensured that the executable file can call relevant functions in the DLL file to enable the executable file to be run correctly. During repairing of the DLL file, if an instruction for running the executable file is received, the instruction cannot be responded to. Therefore, the instruction may be refused, and the user is notified to perform running after the repairing is completed; or when the instruction for running is received again, the executable file is run automatically by default after the repairing is completed.

In the foregoing method provided in this embodiment, an import section in an executable file is read; according to DLL file information recorded in the import section, a pre-established correspondence between a DLL file and a save path is searched to obtain a save path of each DLL file recorded in the import section; for the save path, obtained through searching, of each DLL file, it is determined whether there is a corresponding DLL file saved under the save path; it is determined, if there is no corresponding DLL file saved under the save path, that the unsaved DLL file is lost; it is notified, when an instruction for running the executable file is received, that the DLL file is lost, and a current running process of the executable file is ended; a user is queried whether to repair the DLL file; and after the user gives a confirmation, an installation package of the DLL file is called to repair the DLL file. Therefore, intelligent awareness of loss of the DLL file is achieved, and repairing is automatically performed after a user is notified, thereby facilitating repairing of the DLL file; the user does not need to manually perform processes such as downloading and installation, thereby reducing a requirement on the user, achieving an easy operation, and facilitating use for the user. Moreover, during running of the executable file, loss of the DLL file may be determined without the need of performing an operation of loading the DLL file to an address space, and pre-determining is completed before the running, thereby improving repairing efficiency.

Embodiment 3

Figure 4:
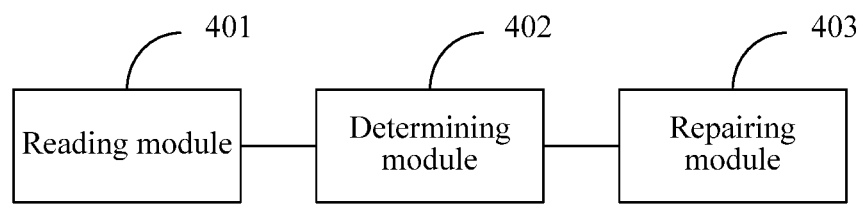
FIG. 4 is a structural diagram of an apparatus for repairing a DLL file according to Embodiment 3 of the present invention.

Referring to FIG. 4, this embodiment provides an apparatus for repairing a DLL file, including:

a reading module 401, configured to read an import section in an executable file;

a determining module 402, configured to determine, according to DLL file information recorded in the import section and a pre-established correspondence between a DLL file and a save path, that a DLL file is lost; and a repairing module 403, configured to notify, when an instruction for running the executable file is received, that the DLL file is lost, and call an installation package of the DLL file to repair the DLL file.

Figure 5:
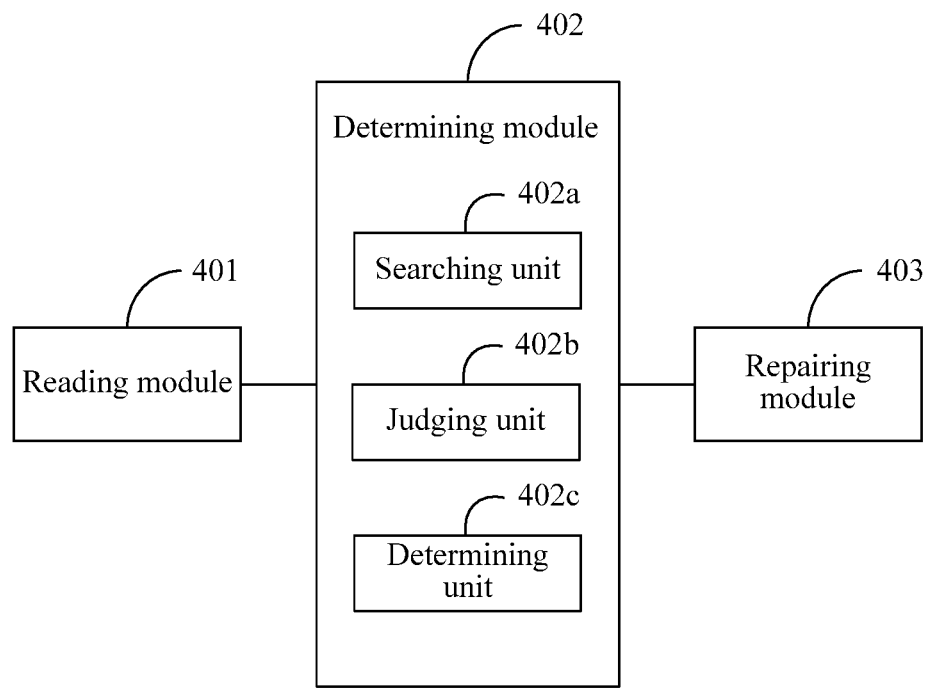
FIG. 5 is another structural diagram of an apparatus for repairing a DLL file according to Embodiment 3 of the present invention.

Referring to FIG. 5, in this embodiment, the determining module 402 may include:

a searching unit 402a, configured to search, according to the DLL file information recorded in the import section, the pre-established correspondence between a DLL file and a save path to obtain a save path of each DLL file recorded in the import section;

a judging unit 402b, configured to: determine, for the save path of each DLL file obtained through searching, whether there is a corresponding DLL file saved under the save path; and a determining unit 402c, configured to determine, if there is no corresponding DLL file saved under the save path, that the unsaved DLL file is lost.

In this embodiment, the apparatus may further include:

an ending module, configured to end a current running process of the executable file before the repairing module calls the installation package of the DLL file to repair the DLL file.

In this embodiment, the repairing module may include:

a querying unit, configured to query a user whether to repair the DLL file; and a repairing unit, configured to call, after the user gives a confirmation, the installation package of the DLL file to repair the DLL file.

In this embodiment, the apparatus may further include:

a responding module, configured to determine, when the instruction for running the executable file is received again, whether repairing of the DLL file is completed; and respond, if the repairing of the DLL file is completed, to the instruction that is received again and run the executable file; and refuse, if the repairing of the DLL file is not completed, to respond to the instruction that is received again, or respond to the instruction that is received again after the repairing is completed.

The foregoing apparatus provided in this embodiment may execute the method provided by any of the foregoing method embodiments. Refer to descriptions in the foregoing method embodiments for a detailed process, and the details are not described herein again. The foregoing apparatus may be applied to a terminal. The terminal includes, but is not limited to, a mobile phone, a tablet computer, a computer, a notebook computer, and the like.

With the foregoing apparatus provided in this embodiment, an import section in an executable file is read; it is determined, according to DLL file information recorded in the import section and a pre-established correspondence between a DLL file and a save path, that a DLL file is lost; and it is notified, when an instruction for running the executable file is received, that the DLL file is lost, and an installation package of the DLL file is called to repair the DLL file. Therefore, intelligent awareness of loss of the DLL file is achieved, and repairing is automatically performed after a user is notified, thereby facilitating repairing of the DLL file; the user does not need to manually perform processes such as downloading and installation, thereby reducing a requirement on the user, achieving an easy operation, and facilitating use for the user. Moreover, during running of the executable file, loss of the DLL file may be determined without the need of performing an operation of loading the DLL file to an address space, and pre-determining is completed before the running, thereby improving repairing efficiency.

Embodiment 4

Figure 6:
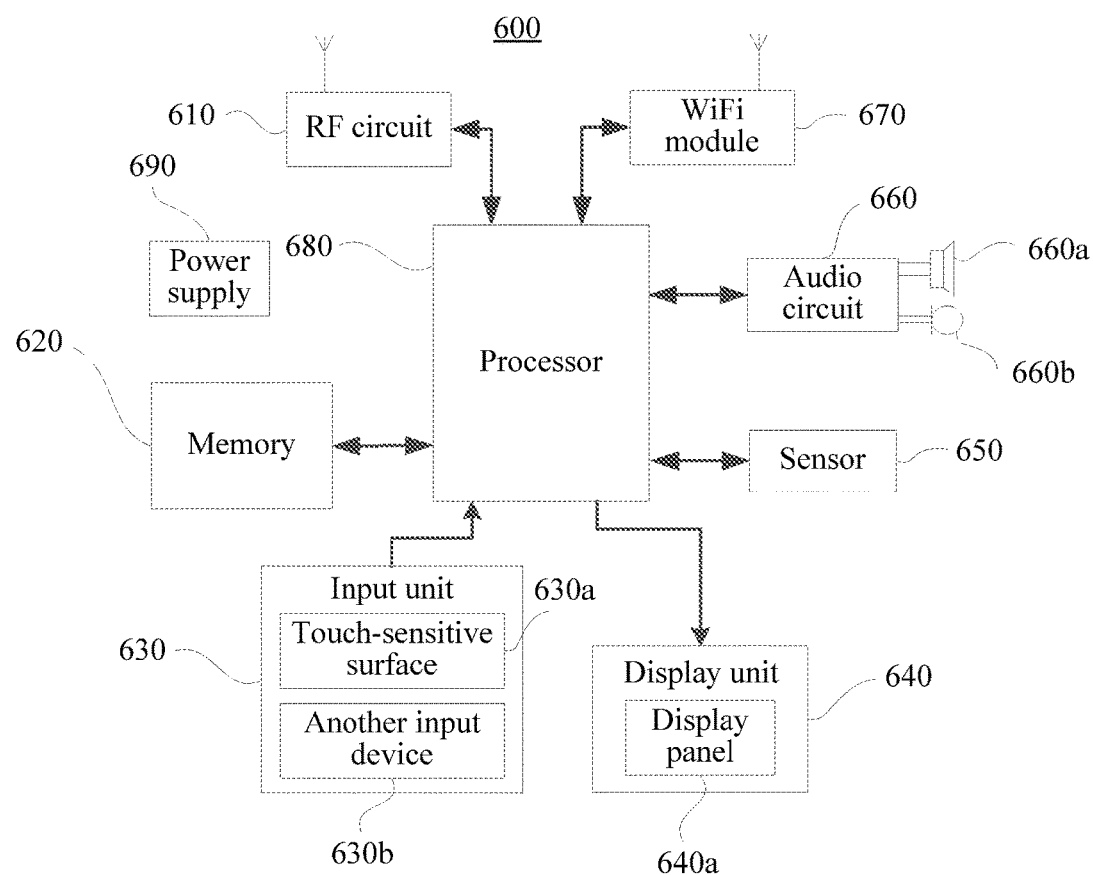
FIG. 6 is a structural diagram of a terminal according to Embodiment 4 of the present invention.

Referring to FIG. 6, this embodiment provides a terminal 600. The terminal 600 may include components such as a communications unit 610, a memory 620 including one or more non-volatile readable storage media, an input unit 630, a display unit 640, a sensor 650, an audio circuit 660, a wireless fidelity (WiFi) module 670, a processor 680 including one or more processing cores, and a power supply 690.

A person skilled in the art may understand that the structure of the terminal shown in FIG. 6 does not constitute a limitation to the terminal, and the terminal may include more components or fewer components than those shown in the figure, or some components may be combined, or a different component deployment may be used.

The communications unit 610 may be configured to receive and send signals during an information receiving and sending process or a call process. The communications unit 610 may be a network communications device, such as a radio frequency (RF) circuit, a router, or a modem. Particularly, when the communications unit 610 is the RF circuit, the communications unit receives downlink information from a base station, then delivers the downlink information to one or more processors 680 for processing, and sends related uplink data to the base station. Generally, the RF circuit serving as the communications unit includes, but is not limited to, an antenna, at least one amplifier, a tuner, one or more oscillators, a subscriber identity module (SIM) card, a transceiver, a coupler, a low noise amplifier (LNA), and a duplexer. In addition, the communications unit 610 may also communicate with a network and another device by wireless communication. The wireless communication may use any communications standard or protocol, which includes, but is not limited to, Global System for Mobile communications (GSM), a General Packet Radio Service (GPRS), Code Division Multiple Access (CDMA), Wideband Code Division Multiple Access (WCDMA), Long Term Evolution (LTE), e-mail, Short Messaging Service (SMS). The memory 620 may be configured to store a software program and module. The processor 680 runs the software program and module stored in the memory 620, to implement various functional applications and data processing. The memory 620 may mainly include a program storage area and a data storage area. The program storage area may store an operating system, an application program required by at least one function (such as a sound playback function and an image display function), and the like. The data storage area may store data (such as audio data and an address book) created according to use of the terminal 600, and the like. In addition, the memory 620 may include a high speed random access memory, and may also include a non-volatile memory, such as at least one magnetic disk storage device, a flash memory, or another volatile solid-state storage device. Accordingly, the memory 620 may further include a memory controller, so as to provide access of the processor 680 and the input unit 630 to the memory 620.

The input unit 630 may be configured to receive input digit or character information, and generate a keyboard, mouse, joystick, optical, or track ball signal input related to the user setting and function control. Optionally, the input unit 630 may include a touch-sensitive surface 630a and another input device 630b. The touch-sensitive surface 630a, which may also be referred to as a touch screen or a touch panel, may collect a touch operation of a user on or near the touch-sensitive surface (such as an operation of a user on or near the touch-sensitive surface 630a by using any suitable object or accessory, such as a finger or a stylus), and drive a corresponding connection apparatus according to a preset program. Optionally, the touch-sensitive surface 630a may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 680. Moreover, the touch controller can receive and execute a command sent from the processor 680. In addition, the touch-sensitive surface 630a may be a resistive, capacitive, infrared, or surface sound wave type touch-sensitive surface. In addition to the touch-sensitive surface 630a, the input unit 630 may further include the another input device 630b. Optionally, the another input device 630b may include, but is not limited to, one or more of a physical keyboard, a functional key (such as a volume control key or a switch key), a track ball, a mouse, and a joystick.

The display unit 640 may be configured to display information input by the user or information provided for the user, and various graphical user interfaces of the terminal 600. The graphical user interfaces may be formed by a graph, a text, an icon, a video, or any combination thereof. The display unit 640 may include a display panel 640a. Optionally, the display panel 640a may be configured by using a liquid crystal display (LCD), an organic light-emitting diode (OLED), or the like. Further, the touch-sensitive surface 630a may cover the display panel 640a. After detecting a touch operation on or near the touch-sensitive surface 630a, the touch-sensitive surface 630a transfers the touch operation to the processor 680, so as to determine the type of the touch event. Then, the processor 680 provides a corresponding visual output on the display panel 640a according to the type of the touch event. Although, in FIG. 6, the touch-sensitive surface 630a and the display panel 640a are used as two separate parts to implement input and output functions, in some embodiments, the touch-sensitive surface 630a and the display panel 640a may be integrated to implement the input and output functions.

The terminal 600 may further include at least one sensor 650, such as an optical sensor, a motion sensor, and other sensors. Optionally, the optical sensor may include an ambient light sensor and a proximity sensor. The ambient light sensor can adjust luminance of the display panel 640a according to brightness of the ambient light. The proximity sensor may switch off the display panel 640a and/or backlight when the terminal 600 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 600 are not further described herein.

The audio circuit 660, a loudspeaker 660a, and a microphone 660b may provide audio interfaces between the user and the terminal 600. The audio circuit 660 may convert received audio data into an electric signal and transmit the electric signal to the loudspeaker 660a. The loudspeaker 660a converts the electric signal into a sound signal for output. On the other hand, the microphone 660b converts a collected sound signal into an electric signal. The audio circuit 660 receives the electric signal and converts the electric signal into audio data, and outputs the audio data to the processor 680 for processing. Then, the processor 680 sends the audio data to, for example, another terminal by using the RF circuit 610, or outputs the audio data to the memory 620 for further processing. The audio circuit 660 may further include an earplug jack, so as to provide communication between a peripheral earphone and the terminal 600.

To implement wireless communication, the terminal may be configured with a wireless communications unit 670. The wireless communications unit 670 may be a WiFi module. WiFi is a short distance wireless transmission technology. The terminal 600 may help, by using the wireless communications unit 670, the user to receive and send e-mails, browse a webpage, and access streaming media, and so on, which provides wireless broadband Internet access for the user. Although FIG. 6 shows the wireless communications unit 670, it may be understood that the wireless communications unit is not a necessary component of the terminal 600, and when required, the wireless communications unit may be omitted as long as the scope of the essence of the present disclosure is not changed.

The processor 680 is the control center of the terminal 600, and is connected to various parts of the mobile phone by using various interfaces and lines. By running or executing the software program and/or module stored in the memory 620, and invoking data stored in the memory 620, the processor 680 performs various functions and data processing of the terminal 600, thereby performing overall monitoring on the mobile phone. Optionally, the processor 680 may include one or more processing cores. Preferably, the processor 680 may integrate an application processor and a modem. The application processor mainly processes an operating system, a user interface, an application program, and the like. The modem mainly processes wireless communication. It may be understood that, the foregoing modem may also not be integrated into the processor 680.

The terminal 600 further includes the power supply 690 (such as a battery) for supplying power to the components. Preferably, the power supply may be logically connected to the processor 680 by using a power management system, thereby implementing functions such as charging, discharging, and power consumption management by using the power management system. The power supply 690 may further include one or more of a direct current or alternating current power supply, a re-charging system, a power failure detection circuit, a power supply converter or inverter, a power supply state indicator, and any other components.

Although not shown in the figure, the terminal 600 may further include a camera, a Bluetooth module, and the like, which are not further described herein.

An optional structure of the terminal 600 is given above with reference to FIG. 6. One or more modules are stored in the memory and configured to be executed by one or more processors. The one or more modules have the following functions:

reading an import section in an executable file;

determining, according to DLL file information recorded in the import section and a pre-established correspondence between a DLL file and a save path, that a DLL file is lost; and notifying, when an instruction for running the executable file is received, that the DLL file is lost, and calling an installation package of the DLL file to repair the DLL file.

The determining, according to DLL file information recorded in the import section and a pre-established correspondence between a DLL file and a save path, that a DLL file is lost includes:

searching, according to the DLL file information recorded in the import section, the pre-established correspondence between a DLL file and a save path to obtain a save path of each DLL file recorded in the import section;

determining, for the save path of each DLL file obtained through searching, whether there is a corresponding DLL file saved under the save path; and determining, if there is no corresponding DLL file saved under the save path, that the unsaved DLL file is lost.

Before the calling an installation package of the DLL file to repair the DLL file, the functions further include:

ending a current running process of the executable file.

The calling an installation package of the DLL file to repair the DLL file includes:

querying a user whether to repair the DLL file; and calling, after the user gives a confirmation, the installation package of the DLL file to repair the DLL file.

The one or more modules may further have the following functions:

determining, when the instruction for running the executable file is received again, whether repairing of the DLL file is completed; and responding, if the repairing of the DLL file is completed, to the instruction that is received again and running the executable file; and refusing, if the repairing of the DLL file is not completed, to respond to the instruction that is received again, or responding to the instruction that is received again after the repairing is completed.

With the foregoing terminal provided in this embodiment, an import section in an executable file is read; it is determined, according to DLL file information recorded in the import section and a pre-established correspondence between a DLL file and a save path, that a DLL file is lost; and it is notified, when an instruction for running the executable file is received, that the DLL file is lost, and an installation package of the DLL file is called to repair the DLL file. Therefore, intelligent awareness of loss of the DLL file is achieved, and repairing is automatically performed after a user is notified, thereby facilitating repairing of the DLL file; the user does not need to manually perform processes such as downloading and installation, thereby reducing a requirement on the user, achieving an easy operation, and facilitating use for the user. Moreover, during running of the executable file, loss of the DLL file may be determined without the need of performing an operation of loading the DLL file to an address space, and pre-determining is completed before the running, thereby improving repairing efficiency.

Embodiment 5

This embodiment of the present invention provides a non-volatile readable storage medium. The storage medium stores one or more modules. When the one or more modules are applied in a device, the device is enabled to execute instructions including the following steps:

reading an import section in an executable file;

determining, according to DLL file information recorded in the import section and a pre-established correspondence between a DLL file and a save path, that a DLL file is lost; and notifying, when an instruction for running the executable file is received, that the DLL file is lost, and calling an installation package of the DLL file to repair the DLL file.

The determining, according to DLL file information recorded in the import section and a pre-established correspondence between a DLL file and a save path, that a DLL file is lost includes:

searching, according to the DLL file information recorded in the import section, the pre-established correspondence between a DLL file and a save path to obtain a save path of each DLL file recorded in the import section;

determining, for the save path of each DLL file obtained through searching, whether there is a corresponding DLL file saved under the save path; and determining, if there is no corresponding DLL file saved under the save path, that the unsaved DLL file is lost.

Before the calling an installation package of the DLL file to repair the DLL file, the following step is further included:

ending a current running process of the executable file.

The calling an installation package of the DLL file to repair the DLL file includes:

querying a user whether to repair the DLL file; and calling, after the user gives a confirmation, the installation package of the DLL file to repair the DLL file.

The foregoing device may further execute instructions including the following steps:

determining, when the instruction for running the executable file is received again, whether repairing of the DLL file is completed; and responding, if the repairing of the DLL file is completed, to the instruction that is received again and running the executable file; and refusing, if the repairing of the DLL file is not completed, to respond to the instruction that is received again, or responding to the instruction that is received again after the repairing is completed.

With the foregoing non-volatile readable storage medium provided in this embodiment, an import section in an executable file is read; it is determined, according to DLL file information recorded in the import section and a pre-established correspondence between a DLL file and a save path, that a DLL file is lost; and it is notified, when an instruction for running the executable file is received, that the DLL file is lost, and an installation package of the DLL file is called to repair the DLL file. Therefore, intelligent awareness of loss of the DLL file is achieved, and repairing is automatically performed after a user is notified, thereby facilitating repairing of the DLL file; the user does not need to manually perform processes such as downloading and installation, thereby reducing a requirement on the user, achieving an easy operation, and facilitating use for the user. Moreover, during running of the executable file, loss of the DLL file may be determined without the need of performing an operation of loading the DLL file to an address space, and pre-determining is completed before the running, thereby improving repairing efficiency.

A person of ordinary skill in the art may understand that all or some of the steps of the foregoing embodiments may be implemented by using hardware, or may be implemented by a program instructing relevant hardware. The program may be stored in a non-volatile readable storage medium. The non-volatile readable storage medium may be a read-only memory, a magnetic disk, an optical disc, or the like.

The foregoing descriptions are merely preferred embodiments of the present invention, but are not intended to limit the present disclosure. Any modification, equivalent replacement, or improvement made within the spirit and principle of the present disclosure shall fall within the protection scope of the present disclosure.

What is claimed is:

1. A method for repairing a dynamic link library (DLL) file performed at a computer having one or more processors and memory storing one or more programs to be executed by the one or more processors, the method comprising:

pre-determining whether there is any lost DLL file required by an executable file before running the executable file by:

reading an import section in the executable file without loading a plurality of DLL files needed by the executable file into an address space allocated for the executable file, wherein the import section at least records DLL file information regarding the plurality of DLL files needed by the executable file, and wherein the DLL file information includes pre-established correspondences between the plurality of DLL files needed by the executable file and a plurality of save paths for storing the plurality of DLL files respectively;

determining, according to the DLL file information recorded in the import section, whether one or more DLL files of the plurality of DLL files are lost, wherein the determining is performed before receiving an instruction for running the executable file and without loading the plurality of DLL files to the address space, the determining further comprising: searching, in accordance with the pre-established correspondences, the respective save paths to determine whether the plurality of DLL files are located under the respective save paths and determining that the one or more DLL files are lost when they are not located under the corresponding save paths;

receiving an instruction for running the executable file;

in response to the instruction for running the executable file:

generating a notification of the loss of the one or more DLL files to a user of the computer;

acquiring information of the one or more lost DLL files associated with the executable file;

calling an installation package of the DLL file to repair the one or more lost DLL files; and after repairing the one or more lost DLL files, automatically running the executable file by loading the plurality of DLL files to the address space, the plurality of DLL files including the one or more repaired DLL files.

2. The method according to claim 1, before the calling the installation package of the DLL file to repair the one or more lost DLL files, further comprising:

ending a current running process of the executable file.

3. The method according to claim 1, wherein the calling the installation package of the DLL file to repair the one or more lost DLL files comprises:

querying a user whether to repair the one or more lost DLL files; and calling, after the user gives a confirmation, the installation package of the DLL file to repair the one or more lost DLL files.

4. The method according to claim 1, wherein the method further comprises:

determining, in response to receiving a second request for running the executable file again, whether repairing of the one or more DLL files are completed;

in accordance with a determination that the repairing of the one or more DLL files are completed, responding to the second request and running the executable file; and in accordance with a determination that the repairing of the one or more lost DLL files are not completed, refusing to respond to the second request, or responding to the second request after the repairing of the one or more lost DLL files are completed.

5. An apparatus for repairing a DLL file, comprising:
one or more processors; and
memory storing one or more programs for execution by the one or more processors, the one or more programs including instructions for:
pre-determining whether there is any lost DLL file required by an executable file before running the executable file by:
reading an import section in the executable file without loading a plurality of DLL files needed by the executable file into an address space allocated for the executable file, wherein the import section at least records DLL file information regarding the plurality of DLL files needed by the executable file, and wherein the DLL file information includes pre-established correspondences between the plurality of DLL files needed by the executable file and a plurality of save paths for storing the plurality of DLL files respectively;
determining, according to the DLL file information recorded in the import section, whether one or more DLL files of the plurality of DLL files are lost, wherein the determining is performed before receiving an instruction for running the executable file and without loading the plurality of DLL files to the address space, the determining further comprising: searching, in accordance with the pre-established correspondences, the respective save paths to determine whether the plurality of DLL files are located under the respective save paths and determining that the one or more DLL files are lost when they are not located under the corresponding save paths;
receiving an instruction for running the executable file;
in response to the instruction for running the executable file:
generating a notification of the loss of the one or more DLL files to a user of the computer;
acquiring information of the one or more lost DLL files associated with the executable file;
calling an installation package of the DLL file to repair the one or more lost DLL files; and
after repairing the one or more lost DLL files, automatically running the executable file by loading the plurality of DLL files to the address space, the plurality of DLL files including the one or more repaired DLL files.

6. The apparatus according to claim 5, wherein the one or more program modules further include instructions for:
before the calling the installation package of the DLL file to repair the one or more lost DLL files, ending a current running process of the executable file.

7. The apparatus according to claim 5, wherein the calling the installation package of the DLL file to repair the one or more lost DLL files comprises:
querying a user whether to repair the one or more lost DLL files; and
calling, after the user gives a confirmation, the installation package of the DLL file to repair the one or more lost DLL files.

8. The apparatus according to claim 5, wherein the one or more program modules further include instructions for:
determining, in response to receiving a second request for running the executable file again, whether repairing of the one or more DLL files are completed;
in accordance with a determination that the repairing of the one or more DLL files are completed, responding to the second request and running the executable file; and
in accordance with a determination that the repairing of the one or more lost DLL files are not completed, refusing to respond to the second request, or respond to the second request after the repairing of the one or more DLL files are completed.

9. A non-transitory computer-readable storage medium having instructions stored thereon, wherein the instructions, when executed by one or more processors of a computer, cause the one or more processors to perform operations comprising:
pre-determining whether there is any lost DLL file required by an executable file before running the executable file by:
reading an import section in the executable file without loading a plurality of DLL files needed by the executable file into an address space allocated for the executable file, wherein the import section at least records DLL file information regarding the plurality of DLL files needed by the executable file, and wherein the DLL file information includes pre-established correspondences between the plurality of DLL files needed by the executable file and a plurality of save paths for storing the plurality of DLL files respectively;
determining, according to the DLL file information recorded in the import section, whether one or more DLL files of the plurality of DLL files are lost, wherein the determining is performed before receiving an instruction for running the executable file and without loading the plurality of DLL files to the address space, the determining further comprising: searching, in accordance with the pre-established correspondences, the respective save paths to determine whether the plurality of DLL files are located under the respective save paths and determining that the one or more DLL files are lost when they are not located under the corresponding save paths;
receiving an instruction for running the executable file;
in response to the instruction for running the executable file:
generating a notification of the loss of the one or more DLL files to a user of the computer;
acquiring information of the one or more lost DLL files associated with the executable file;
calling an installation package of the DLL file to repair the one or more lost DLL files; and
after repairing the one or more lost DLL files, automatically running the executable file by loading the plurality of DLL files to the address space, the plurality of DLL files including the one or more repaired DLL files.

10. The non-transitory computer-readable storage medium of claim 9, further comprises instructions for:
before the calling the installation package of the DLL file to repair the one or more lost DLL files, ending a current running process of the executable file.

11. The non-transitory computer-readable storage medium of claim 9, wherein the calling the installation package of the DLL file to repair the one or more lost DLL files comprises:
querying a user whether to repair the one or more lost DLL files; and
calling, after the user gives a confirmation, the installation package of the DLL file to repair the one or more lost DLL files.

12. The non-transitory computer-readable storage medium of claim 9, further comprises instructions for:

determining, in response to receiving a second request for running the executable file again, whether repairing of the one or more DLL files are completed;

in accordance with a determination that the repairing of the one or more files are completed, responding to the second request and running the executable file; and in accordance with a determination that the repairing of the one or more lost DLL files are not completed, refusing to respond to the second request, or respond to the second request after the repairing of the one or more DLL files are completed.

* * * * *